United States Patent Office 3,150,955
Patented Sept. 29, 1964

3,150,955
PROCESS FOR PRODUCING A FREE-FLOWING MULTI-LAYER UREAFORM COATED FERTILIZER
Joseph A. Smith, Richmond, Va., assignor to Allied Chemical Corporation, New York, N.Y., a corporation of New York
No Drawing. Filed Nov. 3, 1961, Ser. No. 149,861
4 Claims. (Cl. 71—28)

This invention relates to a mixed fertilizer containing a large portion of its nitrogen in the form of slow acting ureaform nitrogen of good agronomic availability and to the method of making the same.

Ureaform nitrogen has been used in admixture with other fertilizer materials. In most processes of the prior art the urea and formaldehyde are admixed in the desired proportion, reacted and dried, to give the solid ureaform which is then admixed with the other fertilizer ingredients. It has furthermore been suggested that the ureaform be formed in situ by allowing the reaction between urea and formaldehyde solutions to take place in the presence of acidic fertilizer materials wherein the acidic nature of the fertilizer is used to bring the pH of the reactants within the proper reaction range of urea and formaldehyde, preferably between 3.2 and 5.5.

While ureaform prepared in accordance with certain of the processes of the prior art makes suitable nitrogenous fertilizer of slow availability and high nitrogen content, the processes require either the use of a complex plant or a prolonged curing period at selected temperatures. As a result, the price of the product is necessarily high.

It has now been found that it is possible to make a mixed fertilizer containing a large portion of its nitrogen in the form of a coating of a slow acting ureaform nitrogen of good agronomic availability without resort to prolonged curing by mixing at about 45° to 75° C. a urea-formaldehyde aqueous concentrate containing about 10 to 40 percent water with urea to give a mixture having about 5 percent to 20 percent water, having at least 80 percent of the urea in solution, having a pH of at least about 7 and having a urea to formaldehyde mol ratio between 1.2 and 2.0; adjusting the pH of said mixture to a value between about 2.5 and about 3.5 by the addition of a mineral acid thereto and not more than one minute thereafter admixing said mixture at temperatures not above about 75° C. with solid fertilizer ingredients having a pH between about 3 and about 6; neutralizing the mixture so produced, containing ureaform, to a pH of at least 5; and drying to obtain a free-flowing ureaform coated fertilizer having an activity index of at least about 40.

In the process of this invention urea and a liquid urea-formaldehyde product, prepared in accordance with U.S. Patent 2,652,377, may be continuously fed to a heated, agitated tank, equipped with an overflow line, in a proportion to give a mol ratio of urea to formaldehyde between 1.2 and 2.0, preferably between 1.4 and 1.8. The liquid urea-formaldehyde product which is the preferred source for the formaldehyde is N-dure, a commercial urea-formaldehyde solution containing about 60 percent formaldehyde, 25 percent urea, and 15 percent water. Concentrates containing about 10 to 40 percent water are suitable for this purpose. The preferred source of the remainder of the urea is a solid urea in the form of crystals or pellets.

When using such concentrated sources of urea and formaldehyde together with a minimum amount of water, it is desirable to maintain the contents of the dissolving tank within the range of 45 to 75° C., the preferred range being between 65 and 75° C. The temperature limitation is of some importance since at temperatures even a few degrees above 75° C., the tank contents have the tendency to polymerize rapidly and set up to form a solid mass. While at lower temperatures, an excessively long time is required to get the urea into solution and the resulting slurries are so viscous as to be difficult to be handled. While it is not necessary to have all the urea in solution when it leaves the dissolving tank, it is desirable to have at least 80 percent of it in solution. The water content of the solution also affects the reaction conditions. While the use of more than the minimum water required for fluidity lowers the minimum temperatures which can be used and still obtain a satisfactory degree of solution of the solid urea added, operation with solutions containing an excessive amount of water deleteriously affects the formation of a layer or coating of ureaform on solid fertilizer particles at a later stage in the process. The water content should not exceed 20 percent of the urea-formaldehyde mixture.

Heat is required to maintain the mixture in the dissolving tank within the desired temperature range. Conventional means of heating such as passing steam or heating fluid through a coil immersed in the solution or direct injection of steam are satisfactory. When indirect heat is used, the temperature must be so regulated that the temperatures of heating transfer surfaces are not excessively high, otherwise polymerization may occur at the transfer surface even though the bulk of the solution lies within the preferred temperature range. The pH of the mixture during this period in which the urea is dissolved in urea-formaldehyde solution normally lies within the range of 7 to 8.

In normal operation the retention times in the dissolving tank should be kept between 5 and 25 minutes, preferably 8 to 15 minutes. At retention times below five minutes an undesirably high proportion of the urea usually remains undissolved unless large quantities of water are present. As the time in the dissolving tank is increased, the viscosity of the mixture rises and with operating times above 25 minutes, it would become necessary to add substantial quantities of water to the mixture to maintain a reasonable fluidity of the overflow and to prevent the tank contents from setting up solid.

The minimum optimum amount of water needed to maintain a fluid mixture and obtain adequate dissolution of the solid urea charged, i.e., at least 80 percent, is dependent chiefly upon the mol ratio of urea to formaldehyde when operating within the above-stated time and temperature ranges. At reaction mol ratios of urea to formaldehyde of 1.4, 1.6, 1.8, and 2 at preferred reaction conditions, the minimum amount of water present under optimum conditions is 5.3, 8.2, 9.1, and 9.7 percent of the total mixture. No additional water beyond that furnished by the urea-formaldehyde concentrate is needed at mol ratios of urea to formaldehyde of about 1.4 or less. Operation with more than the optimum amount of water in the reactor is possible, but should not exceed about 20 percent of the urea-ureaformaldehyde concentrate mixture. This amount of water will represent only about 2 percent of the total mix when the urea-formaldehyde mix is later admixed with the dry solids. In the reaction of urea and formaldehyde to form ureaform products, approximately one mol of water is formed for each mol of formaldehyde. Since a portion of this reaction can occur in the dissolving tank, the water in the overflow from the dissolving tank may be somewhat higher than the value calculated from the water charged to the tank.

It is important that the concentrated urea-formaldehyde solution be acidified immediately prior to mixing with the bulk of the solid fertilizer materials which materials are to have a pH of at least about 3. The pH is very critical, especially at temperatures elevated above room temperatures, in determining the extent of condensation in given time between urea and formaldehyde, and thus determining the solubility and availability characteristics of the resulting ureaform nitrogen. Accordingly control of pH is very important in obtaining a product conforming closely to specifications as to nitrogen solubility and availability.

In the subject process the condensation of urea and formaldehyde occurs in the mixing vessel during mixing with the solid fertilizer; hence it is the pH at this stage which is controlling. However that pH is difficult to measure because of the presence of solids. If the contents of the vessel are dissolved in water, dissolved fertilizer solids will produce a different pH in the resulting dilute solution than that in the concentrated aqueous phase in the mixing vessel.

When on the other hand the pH is fixed in the urea-formaldehyde solution is concentrated and the fertilizer solids, it can be easily measured; and when the urea-formaldehyde solution is concentrated and the feritilizer solids have a pH not too far from neutrality, i.e., pH 3–6, the effect of the fertilizer solids on the reaction pH is small. Thus good control of the pH variable can be maintained.

The acidification of the concentrated urea-formaldehyde solution must be performed within a few seconds of mixing the solution with the fertilizer solids, when the solution is at temperatures such as 65–75° C., so that the solution will not react prematurely and become too thick to handle. Temperatures of 65–75° C. are needed to obtain the desired dissolution of urea and desired short time of mixing with the solids; accordingly the acidification should be performed within about 15 seconds before mixing with the fertilizer solids. If a mixing device is used to mix the acidified solution, the time between acidification and mixing with the solids can be shortened to perhaps one second; and as lower temperatures below 65° C. are employed for the urea-formaldehyde dissolution, the time after acidification and before mixing with solids can be lengthened to perhaps as long as one minute. A typical procedure is to add acid to the acidified solution flowing through the delivery pipe to the mixing vessel to give a time of flow of acidified solution in the pipe of about 5–10 seconds.

In continuous operation, the overflow from the dissolving tank is mixed with an acid such as nitric, sulfuric, or phosphoric acid, in sufficient quantity to adjust the pH to above 2.5 and below 3, preferably to about 2.7, immediately before introducing it into the mixing vessel which follows next in the process. The time lapse should not exceed one minute. This mixing vessel is operated at below about 75° C., and the reaction time in the vessel is about 5–15 minutes. Close control of the pH of the dissolving tank overflow as it enters the mixer results in consistent conversion of about 55 to 90 precent of the urea to ureaform products in the mixer. The higher conversions occur when the lower values of mol ratios of urea to formaldehyde are used. Of the ureaform found in the final product about 60 to 80 percent is water insoluble, the higher conversion to water insoluble nitrogen being obtained with the lower mol ratios of urea to formaldehyde. Good agronomic value of the water insoluble nitrogen is indicated by the activity index being about 40 according to the procedure given in paragraph 2.053 of the "Official Methods of Analysis of the Association of Official Agricultural Chemists," Ninth Edition, 1960, modified in accordance with Journal of the Association of Official Agricultural Chemists, volume 44–1, page 134.

It has been found that the pH in the mixing vessel is very critical. It was discovered that pH's below 2.5 result in water insoluble nitrogen of poor activity index, while operation at pH's above 3.5 results in erratic conversion of urea to ureaform nitrogen, much of which conversion occurs in the dryer. It is necessary in the present process to form the bulk of the ureaform prior to drying to avoid forming a sticky mass which is difficult to process in the type of rotary hot air dryers generally found in mixed fertilizer plants. After 5–15 minutes of reaction in the mixer the material is neutralized, preferably with ammonia, to a pH at least 5 prior to drying.

The other raw materials used in the fertilizer are charged to the mixer together with the overflow from the dissolving tank. These raw materials may include ammonium nitrate, additional urea, ammonium sulfate, potash, normal and triple superphosphates, dolomite, vermiculite, and other commonly used fertilizer ingredients. The pH of the raw materials should be above about 3. Superphosphates when used are preferably treated with anhydrous ammonia or an ammoniating solution before addition to the mixer, since untreated superphosphates are acidic and cause a gradual deterioration of the ureaform in the finished product. A portion of these fertilizer salts may as an alternate be added to the dissolving tank rather than directly to the mixer. Recycle, obtained as described below, may also be added to the mixer to regulate the liquid phase in the mixer discharge and provide a material that can be easily processed in conventional dryers. Conventional mixing equipment such as pug mills and TVA ammoniators are suitable for the mixing step.

Excess water in the mixtures discharged from the mixer can be removed by conventional drying methods. Product temperatures during drying should be kept below about 100° C. to avoid lowering the activity index of the insoluble nitrogen. Dried product should be cooled before final pile storage to eliminate further reaction. The fines and oversize are normally removed by screening and returned to the mixer to serve as recycle. The granular material of closely sized particles are removed as product.

The following materials were fed to a jacketed tank equipped with an agitator and overflow line:

27.6 lbs./hr. of N-dure (a commercial solution containing 60% formaldehyde, 25% urea, and 15% water).
39.5 lbs./hr. of pelleted, fertilizer grade urea.
4.0 lbs./hr. of water.

The mol ratio of urea to formaldehyde in this mixture was 1.4. The contents of the tank were maintained at 71° C. by circulating hot water through the jacket. The overflow line was located so that the reactants remained in the tank for an average of ten minutes. The pH was about 8. About 3 percent of the charged solid urea remained undissolved in the overflow stream. Wet process phosphoric acid (1.3 lb./hr.) containing 44.2 percent $P_2O_5$ was added to the overflow from the dissolving tank immediately, i.e., within a few seconds before it entered the mixer at a rate to maintain the acidified mixture at a pH of 2.9. The mixer used was a double-shafted pug mill. To the pug mill were also fed the following materials:

67.7 lbs./hr. ammoniated superphosphate (containing 4.3% ammoniacal nitrogen, 17.5% $P_2O_5$, and 10.3% water).
20.6 lbs./hr. potassium chloride (containing 60.3% $K_2O$).
11.4 lbs./hr. vermiculite.
1.9 lb./hr. dolomite.
650 lbs./hr. recycle of dried material.

Near the discharge end of the pug mill 1.3 lbs./hr. of 20 percent aqua ammonia was added to neutralize the mixture to pH 5.5.

Material discharging from the pug mill contained about 4 percent water. It was fed to a hot air rotary dryer in which it was heated to a temperature of 88° C. The dried product containing about 1–2 percent water was then passed through a cooler where it was cooled to 70° C. It was then passed over a set of screens. Material retained on an 8 mesh screen was crushed and combined with material passing through a 20 mesh screen to provide recycle. Material passing through the 8 mesh screen and retained on the 20 mesh screen was withdrawn as product, except for a small proportion which was added to the recycle to provide the desired quantity of recycle. By this process 150 lbs./hr. of a 16–8–8 fertilizer was produced containing 12.7 percent total ureaform nitrogen and 9.6 percent water insoluble ureaform nitrogen with an activity index of 40. This represented about 86 percent conversion of urea to ureaform with about 75 percent of the ureaform formed being water insoluble. Analysis of product two months after it was first made showed no significant change in either the water insoluble nitrogen content or the activity index indicating that the product was stable. Storage tests showed that the product was still in free-flowing condition after 90 days in bags normally stacked.

While the above description discloses preferred embodiments of the process for manufacturing mixed fertilizers in accordance with this invention, it will be understood that the specific details set forth herein are by way of illustration and are not to be construed as limiting the scope of the invention.

I claim:

1. A process for the manufacture of a mixed fertilizer containing a large portion of its nitrogen in the form of a coating of a slow acting ureaform nitrogen of good agronomic availability which comprises mixing at about 45° to 75° C. a urea-formaldehyde aqueous concentrate containing about 10 to 40 percent water with urea to give a mixture having about 5 percent to 20 percent water, having at least 80 percent of the urea in solution, having a pH of at least about 7 and having a urea to formaldehyde mol ratio between 1.2 and 2.0; adjusting the pH of said mixture to a value between about 2.5 and about 3.5 by the addition of a mineral acid thereto and not more than one minute thereafter admixing said mixture at temperatures not above about 75° C. with solid fertilizer composition ingredients having a pH between about 3 and about 6; neutralizing the mixture so produced, containing ureaform, to a pH of at least 5; and drying to obtain a free-flowing ureaform coated fertilizer having an activity index of at least about 40.

2. A process for the manufacture of a mixed fertilizer containing a large portion of its nitrogen in the form of a coating of a slow acting ureaform nitrogen of good agronomic availability which comprises mixing at about 45° to 75° C. a urea-formaldehyde aqueous concentrate containing about 10 to 40 percent water with solid urea and water to give a mixture having at least 80 percent of the urea in solution, having a pH of at least about 7 and having a urea to formaldehyde mol ratio between 1.4 and 1.8 and a water content about 5 to 20 percent of the total mix, adjusting the pH of said mixture to a value between about 2.5 and 3.5 by the addition of a mineral acid thereto and not more than one minute thereafter admixing said mixture at temperatures not above 75° C. with solid fertilizer composition ingredients having a pH between about 3 and about 6 for at least about five minutes, neutralizing the mixture so produced containing ureaform to a pH of at least 5 and drying to obtain a free-flowing ureaform coated fertilizer having an activity index of at least about 40.

3. A process for the manufacture of a mixed fertilizer containing a large portion of its nitrogen in the form of a multi-layer coating of a slow acting ureaform nitrogen of good agronomic availability which comprises mixing at about 45° to 75° C. a urea-formaldehyde aqueous concentrate containing about 10–40 percent water with urea and water to give a mixture having at least 80 percent of the urea in solution, having a pH of about 7, having a urea to formaldehyde mol ratio between 1.2 and 2.0 and a water content between about 5 and 20 percent, adjusting the pH of said mixture to between 2.5 and 3.5 by the addition of a mineral acid thereto and not more than one minute thereafter admixing said mixture with solid fertilizer composition ingredients having a pH between about 3 and 6 along with recycled product, at temperatures not above about 75° C., neutralizing the mixture produced after about 5–15 minutes mixing to a pH of about 5, drying the product so obtained, screening said product, and separating the particles of the desired size which comprise a free-flowing multi-layer ureaform coated fertilizer having an activity index of at least about 40 and recycling the fines and oversizes of the product.

4. A process for the manufacture of a mixed fertilizer containing a large portion of its nitrogen in the form of a multi-layer coating of a slow acting ureaform nitrogen of good agronomic availability which comprises mixing ureaform formaldehyde concentrate containing about 10–40 percent water with urea and water at a temperature between 45–75° C. for a period of about 5–25 minutes to give a mixture having at least 80 percent of the urea in solution, having a pH of at least about 7, having a urea to formaldehyde mol ratio between 1.4 and 1.8 and a water content between 5 and 20 percent, adjusting the pH of said mixture to a value between about 2.5 and 3.5 by the addition of a mineral acid thereto and not more than 15 seconds thereafter admixing said mixture with solid fertilizer composition ingredients selected from the group consisting of ammonium nitrate, additional urea, ammonium sulfate, potash, normal superphosphate, triple superphosphate, dolomite, and vermiculite, having a pH between about 3 and 6 along with recycled product for a period of about 5–15 minutes at a temperature not more than 75° C., neutralizing the mixture produced to a pH of about 5, drying the product so obtained by use of a hot air rotary dryer, screening said product, and separating the particles of the desired size which comprise a free-flowing multi-layer ureaform coated fertilizer having an activity index of at least about 40 and recycling the fines and oversizes of the product.

References Cited in the file of this patent

UNITED STATES PATENTS

| 2,255,026 | Keenen et al. | Sept. 2, 1941 |
| 2,415,705 | Rohner | Feb. 11, 1947 |
| 2,502,996 | Rohner | Apr. 4, 1950 |
| 2,618,546 | Davenport | Nov. 18, 1952 |
| 2,766,283 | Darden | Oct. 9, 1956 |
| 2,864,685 | Waters | Dec. 16, 1958 |
| 2,955,930 | Kealy | Oct. 11, 1960 |

OTHER REFERENCES

Clark et al.: "Industrial and Engineering Chemistry," vol. 40, No. 7, pages 1178–1183, July 1948. 71–28.